(12) United States Patent
Turkka et al.

(10) Patent No.: US 8,989,789 B2
(45) Date of Patent: Mar. 24, 2015

(54) TERMINAL MOBILITY STATE DETECTION

(75) Inventors: Jussi Taneli Turkka, Tampere (FI); Jani Puttonen, Palokka (FI)

(73) Assignee: Broadcom Corporation, Irvine, CA (US)

( * ) Notice: Subject to any disclaimer, the term of this patent is extended or adjusted under 35 U.S.C. 154(b) by 278 days.

(21) Appl. No.: 13/172,189

(22) Filed: Jun. 29, 2011

(65) Prior Publication Data

US 2013/0005381 A1    Jan. 3, 2013

(51) Int. Cl.
*H04W 8/02* (2009.01)
*G01S 11/06* (2006.01)
*H04W 64/00* (2009.01)
*H04W 36/00* (2009.01)
*H04W 36/32* (2009.01)

(52) U.S. Cl.
CPC ............ *G01S 11/06* (2013.01); *H04W 64/006* (2013.01); *H04W 36/0083* (2013.01); *H04W 36/32* (2013.01)
USPC ........ 455/517; 455/90.1; 455/90.2; 455/90.3; 455/403

(58) Field of Classification Search
CPC .............................. H04H 60/33; H04W 84/00
USPC ....................................................... 455/517
See application file for complete search history.

(56) References Cited

U.S. PATENT DOCUMENTS 6,385,454 B1 * 5/2002 Bahl et al. ...................... 455/450
6,954,650 B2 * 10/2005 Sahinoglu et al. .......... 455/456.6
7,136,631 B1 * 11/2006 Jiang et al. .................. 455/414.1
7,826,415 B2 * 11/2010 Oh et al. ....................... 370/329
8,615,605 B2 * 12/2013 Yu et al. ....................... 709/245
8,618,954 B2 * 12/2013 Free ............................. 340/932

(Continued)

FOREIGN PATENT DOCUMENTS

EP    2 237 469 A1    10/2010
EP    2 326 130 A1    5/2011

(Continued)

OTHER PUBLICATIONS

R2-112390, 3GPP TSG-RAN WG2 #73bis, "Mobility State Detection Enhancement", Shanghai, China, Apr. 11-15, 2011, 1 pgs.

(Continued)

*Primary Examiner* — Hai V Nguyen
(74) *Attorney, Agent, or Firm* — Oblon, McClelland, Maier & Neustadt, L.L.P.

(57) ABSTRACT

There are provided measures for terminal mobility state detection. Such measures may exemplarily include acquiring a statistical metric of measurements of a signal strength of a terminal with unknown speed over a predetermined time period, comparing the acquired statistical metric with mobility patterns stored in a database, each of said mobility patterns exhibiting a relationship between previously acquired statistical metrics of signal strength measurements of terminals with a specific terminal speed class, and determining a terminal speed class of the terminal according to a best match between the acquired statistical metric and the mobility patterns on the basis of the comparison. The database may exemplarily be prepared including acquiring a statistical metric of measurements of a signal strength of a terminal with known speed, and applying the acquired statistical metric for creating or updating the mobility pattern with respect to the specific terminal speed class corresponding to the known speed of the terminal.

20 Claims, 6 Drawing Sheets

(56) References Cited

U.S. PATENT DOCUMENTS

| | | | |
|---|---|---|---|
| 8,630,258 B2 * | 1/2014 | Brisebois | 370/331 |
| 2003/0027574 A1 * | 2/2003 | Watanabe et al. | 455/435 |
| 2004/0203866 A1 * | 10/2004 | Sahinoglu et al. | 455/456.1 |
| 2004/0259567 A1 * | 12/2004 | Valko et al. | 455/456.1 |
| 2006/0232472 A1 | 10/2006 | Roslak | 342/457 |
| 2007/0258408 A1 | 11/2007 | Alizadeh-Shabdiz et al. | 370/331 |
| 2007/0270166 A1 * | 11/2007 | Hampel et al. | 455/456.3 |
| 2009/0238119 A1 * | 9/2009 | Gorsuch | 370/328 |
| 2010/0120443 A1 | 5/2010 | Ren | 455/450 |
| 2011/0130141 A1 * | 6/2011 | Frost et al. | 455/436 |
| 2012/0113837 A1 * | 5/2012 | Siomina et al. | 370/252 |
| 2013/0072245 A1 * | 3/2013 | Lee et al. | 455/509 |

FOREIGN PATENT DOCUMENTS

| | | |
|---|---|---|
| EP | 2326130 A1 * | 5/2011 |
| GB | 2 365 272 A | 2/2001 |
| JP | 10108263 A | 2/1996 |
| WO | WO 01/31824 A1 | 5/2001 |
| WO | WO 01/37447 A1 | 5/2001 |
| WO | WO 2010/121885 A1 | 10/2010 |

OTHER PUBLICATIONS

Mun, M.Y., et al., "Parsimonius Mobility Classification Using GSM and WiFi Traces", © 2008 ACM, 5 pgs.

Smith, I., et al., "Algorithms for Detecting Motion of a GSM Mobile Phone", 5 pgs.

Sohn, T., et al., "Mobility Detection Using Everyday GSM Traces", 14 pgs.

3GPP TS 36.304 V10.1.0 (Mar. 2011), Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 10), (pp. 1 and 19-20).

Chandrasekaran, et al., "Vehicular Speed Estimation Using Received Signal Strength from Mobile Phones", (Sep. 2010), (4 pages).

Chen, et al., "Fast Normalized Cross-Correlation Enhanced Floating Car Data Estimation", (Apr. 2011), (6 pages).

\* cited by examiner

TERMINAL MOBILITY STATE DETECTION

FIELD OF THE INVENTION

The present invention relates to terminal mobility state detection. More specifically, the present invention relates to measures (including methods, apparatuses and computer program products) terminal mobility state detection.

BACKGROUND

In the field of mobile communication systems, including cellular communication systems, terminal speed is a relevant parameter in various contexts and for various purposes. This is due to the fact that terminal mobility represents a paramount aspect in mobile (cellular) communication systems, and various procedures and/or parameters depend on terminal mobility characteristics, including terminal speed.

For example, an appropriate setting of handover (HO) parameters depends, among others, on the speed of a terminal (or UE) in question. Relevant HO parameters may for example include time-to-triggers and signal strength thresholds, which usually depend heavily on terminal speed. In general, pedestrian terminals require longer HO parameters compared with fast moving terminals. If handover parameters are set to favor fast moving terminals, then pedestrian terminals face (many) unnecessary ping-pong handovers. In contrast, if handover parameters are set to favor pedestrian terminals, then fast moving terminals face (many) unnecessary radio link failures. In view thereof, in order to improve network performance by minimizing handover-related radio link failures and ping-pong handovers, it is desirable to set handover parameters in accordance with terminal speed (and other relevant requirements and/or constraints).

Since the terminal speed varies from UE to UE and there are usually many UEs connected to a serving base station simultaneously, this means that a static or a dynamic setting of HO parameters cannot be done globally in a cell for the all UEs in an appropriate manner. This is because in that case only some of the UEs would benefit from the setting and at the same time some of the UEs would suffer therefrom.

If the speed or a mobility state of a terminal (or UE) could be detected reliably enough, then HO parameter setting could be done in a UE-specific manner. This would mean that HO parameters of a single UE could be tuned according to the UE speed or mobility state to avoid mobility-related HO problems.

However, mobile communication systems do typically not include specific facilities for reliably detecting terminal speed. Therefore, especially for terminals which do not include dedicated auxiliary facilities such as a navigation system (e.g. a GNSS on the basis of GPS), it is problematic to reliably detect terminal speed, especially in terms of requirements and/or constraints regarding accuracy, duration (delay) and/or demand for dedicated hardware/software.

There exist some solutions for terminal speed estimation in mobile communication systems. Such proposals include, for example, assignment (classification) of a UE mobility state between low, medium and high velocity UEs based on the UE handover and/or cell re-selection rate. However, such approach suffers from being too slow and from being not accurate enough or unreliable, especially in heterogeneous network environments where cell sizes vary, thus affecting the handover and re-selection rate and mobility classification as well. Such proposals also include, for example, estimation of UE speed from LTE downlink reference signals, rate of timing advancing and magnitude of timing-offset. Further proposals include, for example, improvements to existing specifications and other measurements such as Doppler spread estimation and other measurements related to the Doppler spread e.g., level-crossing-rate and an average-fade-duration measurements. Such proposals suffer from being too slow and/or from requiring dedicated hardware/software for performing corresponding measurements and/or signal processing.

In view thereof, there exist problems in reliably detecting terminal speed in mobile communication systems, especially in terms of requirements and/or constraints regarding accuracy, duration (delay) and/or demand for dedicated hardware/software.

Thus, there is a need to further improve terminal mobility state detection.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising acquiring a statistical metric of measurements of a terminal's signal strength of a terminal with unknown terminal speed over a predetermined time period, comparing the acquired statistical metric with mobility patterns stored in a database, each of said mobility patterns exhibiting a relationship between previously acquired statistical metrics of signal strength measurements of terminals with a specific terminal speed class, and determining a terminal speed class of the terminal according to a best match between the acquired statistical metric and the mobility patterns on the basis of the comparison.

According to further developments or modifications of the aforementioned aspect, a statistical metric of measurements of a terminal's signal strength of a terminal with known terminal speed may be acquired over a predetermined time period, the acquired statistical metric may be applied for creating or updating the mobility pattern with respect to the specific terminal speed class corresponding to the known speed of the terminal, and the created or updated mobility pattern may be stored in the database.

According to further developments or modifications of the aforementioned aspect, a mobility state for the terminal may be assigned based on the determined terminal speed class or based on the determined terminal speed class in connection with a result of a mobility estimation scheme, and/or at least one handover parameter for the terminal may be set according to the determined terminal speed class or the assigned mobility state.

According to an exemplary aspect of the present invention, there is provided a method comprising obtaining a result of measurements of a terminal's signal strength over a predetermined time period, and reporting the obtained result of measurements to a network entity of a cellular communication system.

According to further developments or modifications of the aforementioned aspect, periodical measurements of the terminal's signal strength may be performed, wherein the measurement data may be obtained as the result of measurements, or periodical measurements of the terminal's signal strength may be performed and a statistical metric may be derived from a behavior of the signal strength over the predetermined time period on the basis of the performed measurements, wherein the derived statistical data may be obtained as the result of measurements.

According to an exemplary aspect of the present invention, there is provided an apparatus comprising an interface configured for communication with at least another apparatus, and a processor configured to acquire a statistical metric of measurements of a terminal's signal strength of a terminal with unknown terminal speed over a predetermined time period, compare the acquired statistical metric with mobility patterns stored in a database, each of said mobility patterns exhibiting a relationship between previously acquired statistical metrics of signal strength measurements of terminals with a specific terminal speed class, and determine a terminal speed class of the terminal according to a best match between the acquired statistical metric and the mobility patterns on the basis of the comparison.

According to further developments or modifications of the aforementioned aspect, the processor may be configured to acquire a statistical metric of measurements of a terminal's signal strength of a terminal with known terminal speed over a predetermined time period, to apply the acquired statistical metric for creating or updating the mobility pattern with respect to the specific terminal speed class corresponding to the known speed of the terminal, and to store the created or updated mobility pattern in the database.

According to further developments or modifications of the aforementioned aspect, the processor may be configured to assign a mobility state for the terminal based on the determined terminal speed class or based on the determined terminal speed class in connection with a result of a mobility estimation scheme, and/or to set at least one handover parameter for the terminal according to the determined terminal speed class or the assigned mobility state.

According to an exemplary aspect of the present invention, there is provided an apparatus comprising an interface configured for communication with at least another apparatus, and a processor configured to obtain a result of measurements of a terminal's signal strength over a predetermined time period, and report, via the interface, the obtained result of measurements to a network entity of a cellular communication system.

According to further developments or modifications of the aforementioned aspect, the processor may be configured to perform periodical measurements of the terminal's signal strength, wherein the measurement data is obtained as the result of measurements, or to perform periodical measurements of the terminal's signal strength and to derive a statistical metric from a behavior of the signal strength over the predetermined time period on the basis of the performed measurements, wherein the derived statistical data is obtained as the result of measurements.

According to an exemplary aspect of the present invention, there is provided a computer program product comprising computer-executable components which, when the program is run on a computer (such as one of/in any one of the aforementioned apparatus-related aspects), are configured to execute the method according to any one of the aforementioned method-related aspects.

By way of exemplary embodiments of the present invention, there is provided feasibility of terminal mobility state detection (in/for mobile communication systems). More specifically, by way of exemplary embodiments of the present invention, there are provided measures and mechanisms for terminal mobility state detection (in/for mobile communication systems).

Thus, improvement is achieved by methods, devices and computer program products enabling terminal mobility state detection (in/for mobile communication systems).

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are is described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, for the applicability of thus described exemplary aspects and embodiments, LTE- (including LTE-Advanced-) related cellular communication networks are used as non-limiting examples. As such, the description of exemplary aspects and embodiments given herein specifically refers to terminology which is directly related thereto. Such terminology is only used in the context of the presented non-limiting examples, and does naturally not limit the invention in any way. Rather, any other communication systems, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for terminal mobility state detection.

In the following, exemplary embodiments of the present invention are described with reference to methods, procedures and functions, as well as with reference to structural arrangements and configurations.

Figure 1:
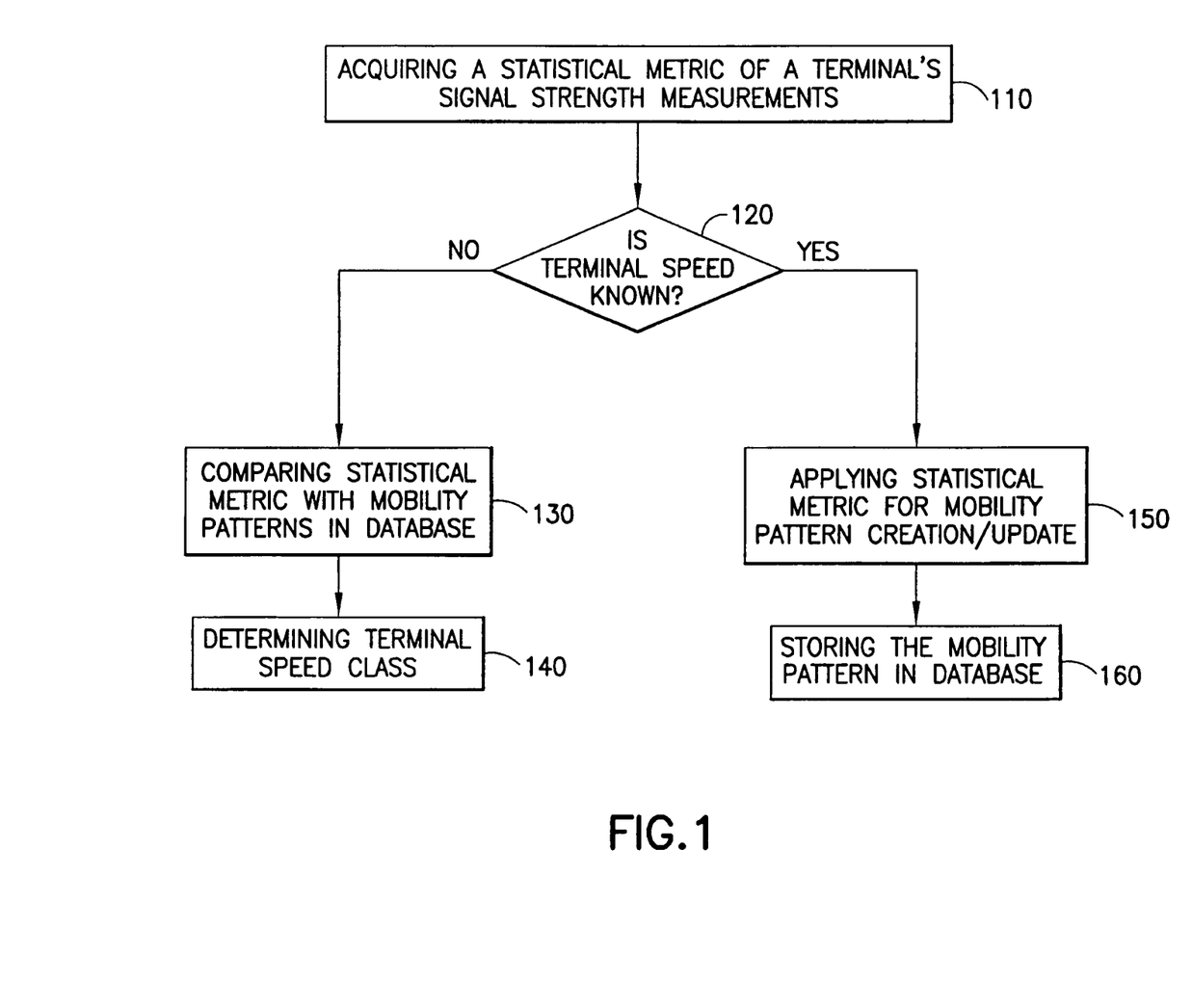
FIG. 1 shows a flowchart illustrating an example of a method according to exemplary embodiments of the present invention.

FIG. 1 shows a flowchart illustrating an example of a method according to exemplary embodiments of the present invention. The method of FIG. 1 is operable at or by an access node or base station of a cellular communication system, e.g. by an eNB of a LTE system or the like.

As shown in FIG. 1, on the one hand, a method according to exemplary embodiments of the present invention may comprise an operation of acquiring (110) a statistical metric of measurements of a terminal's signal strength of a terminal with unknown terminal speed over a predetermined time period, an operation of comparing (130) the acquired statistical metric with mobility patterns stored in a database, and an operation of determining (140) a terminal speed class of the terminal on the basis of the comparison, which may be accomplished according to a best match between the acquired statistical metric and the mobility patterns. Thereby, the detection of terminal mobility state may be achieved according to exemplary embodiments of the present invention.

As shown in FIG. 1, on the other hand, a method according to exemplary embodiments of the present invention may comprise an operation of acquiring (110) a statistical metric of measurements of a terminal's signal strength of a terminal with known terminal speed over a predetermined time period, an operation of applying (150) the acquired statistical metric for creating or updating a mobility pattern with respect to a specific terminal speed class corresponding to the known speed of the terminal, and an operation of storing (160) the created or updated mobility pattern in a database. Thereby, the preparation and maintenance of a database for terminal mobility state detection may be achieved according to exemplary embodiments of the present invention.

As shown in FIG. 1, a method according to exemplary embodiments of the present invention may comprise an operation of discriminating (120) whether the speed of the terminal, the signal strength measurements of which are processed for acquiring the statistical metric, is known or not. Such discrimination may for example be based on a labeling of the measurement data, where the terminal speed of the terminal in question is indicated. Such indication of the terminal speed may for example be attained from an active GNSS (e.g. GPS) at the terminal and/or training measurements which might be done by a third-party.

According to exemplary embodiments of the present invention, each of the mobility patterns exhibits a relationship between previously acquired statistical metrics of signal strength measurements of terminals with a specific terminal speed class, which may for example include a specific speed (e.g. 3 km/h, 30 km/h, 120 km/h) and/or a specific speed range (e.g. 3±x km/h, 30±y km/h, 120±z km/h, where parameters x, y and z may be equal or different) and/or a specific speed type (e.g. stationary, low speed, medium speed, high speed). A mobility pattern may be a distribution or a low-dimensional presentation of the data, i.e. previously acquired statistical metrics, with respect to the specific terminal speed class. A mobility pattern may be used to classify measurements of (a terminal with) unknown speed so as to determine terminal speed class or detect terminal mobility state. That is, a corresponding database, which may be located at the access node or base station or an any other network control entity (such as a RNC, MME, or the like) of a cellular communication system, may comprise datasets (or samples) each being associated with a specific terminal speed or terminal speed range or class (which may corresponding to a specific mobility state or class).

In accordance with the characteristics of the mobility patterns, the terminal speed class may be determined to be for example any one of a specific speed (e.g. 3 km/h, 30 km/h, 120 km/h) and/or a specific speed range (e.g. 3±x km/h, 30±y km/h, 120±z km/h, where parameters x, y and z may be equal or different) and/or a specific speed type (e.g. stationary, low speed, medium speed, high speed).

While being referred to as speed class herein, the property of terminal speed being determined may also be referred to as speed category, speed type, or the like.

Figure 2:
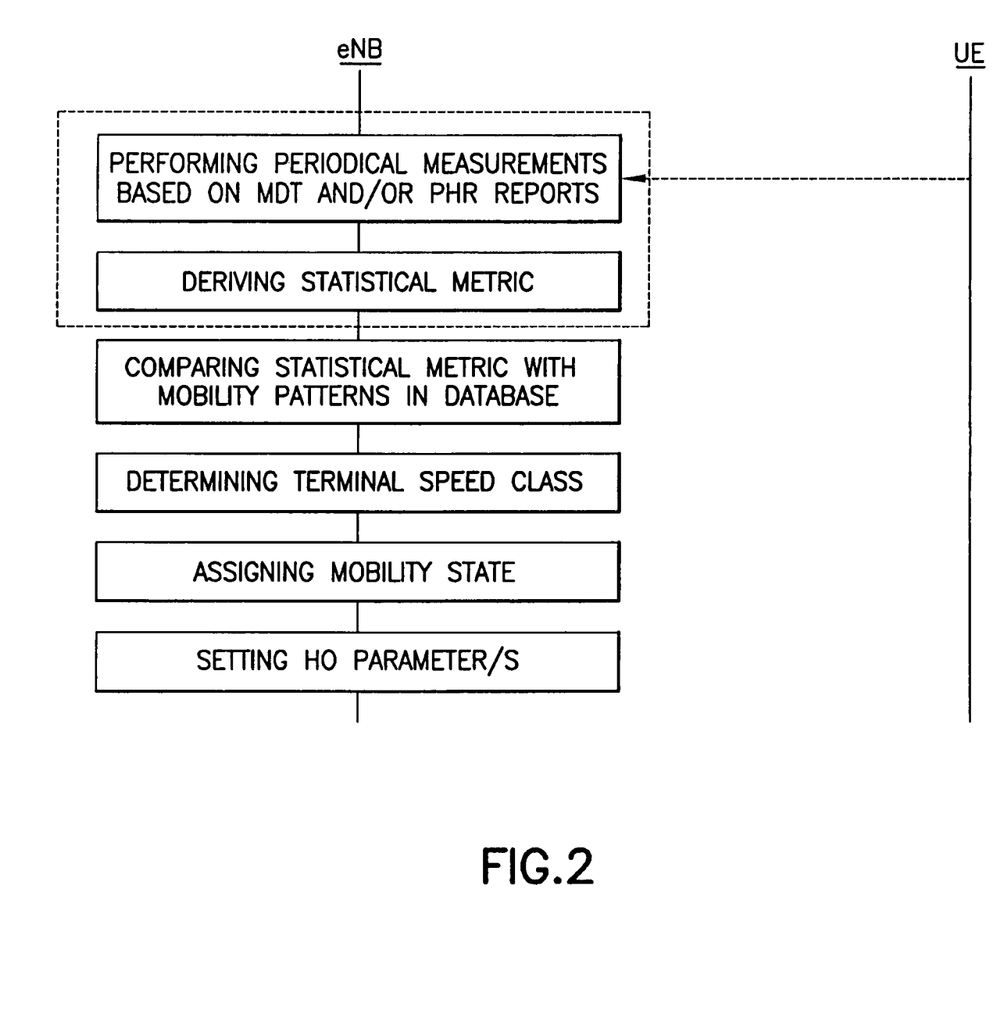
FIG. 2 shows a signaling diagram illustrating a first example of a procedure according to exemplary embodiments of the present invention.
Figure 3:
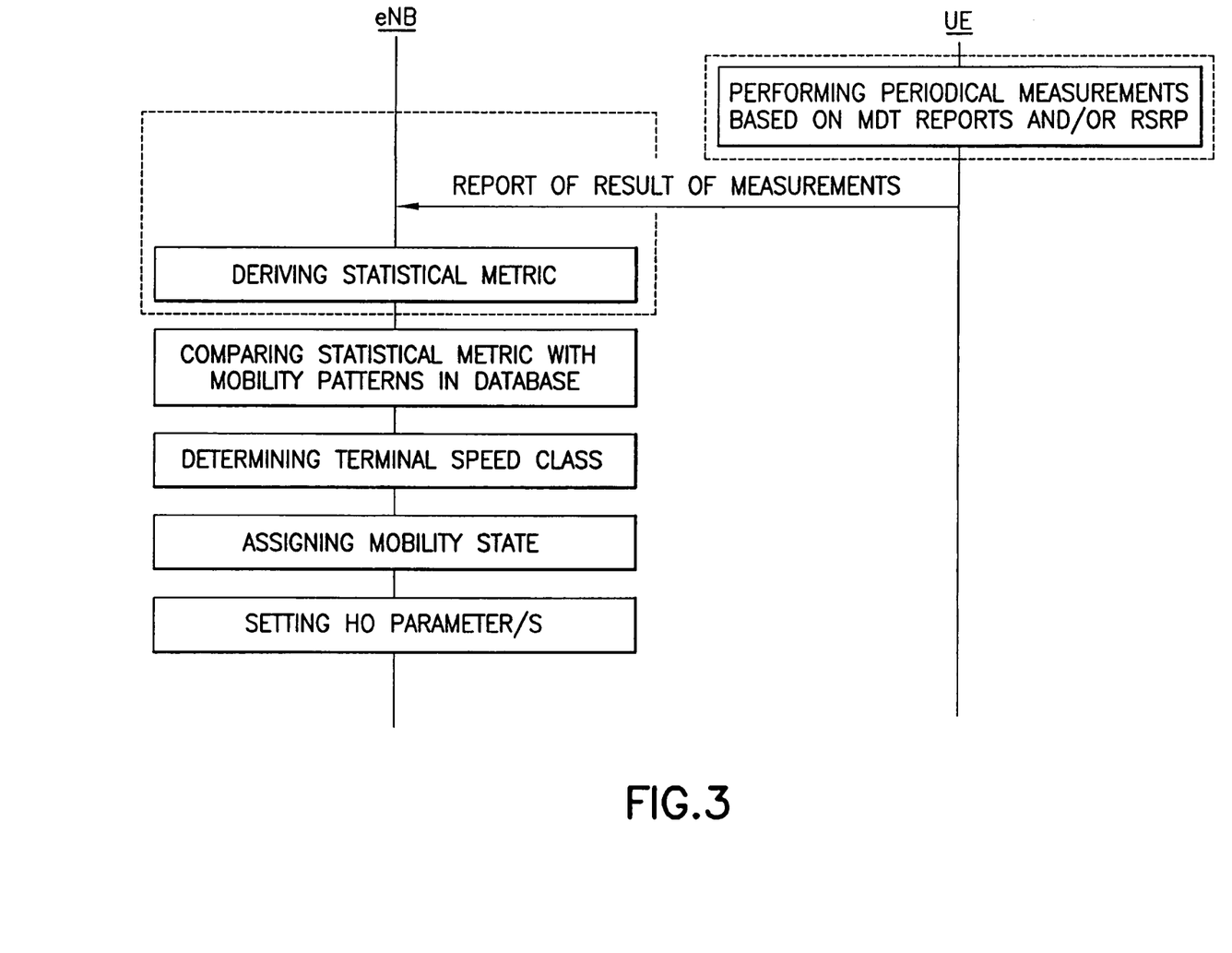
FIG. 3 shows a signaling diagram illustrating a second example of a procedure according to exemplary embodiments of the present invention.
Figure 4:
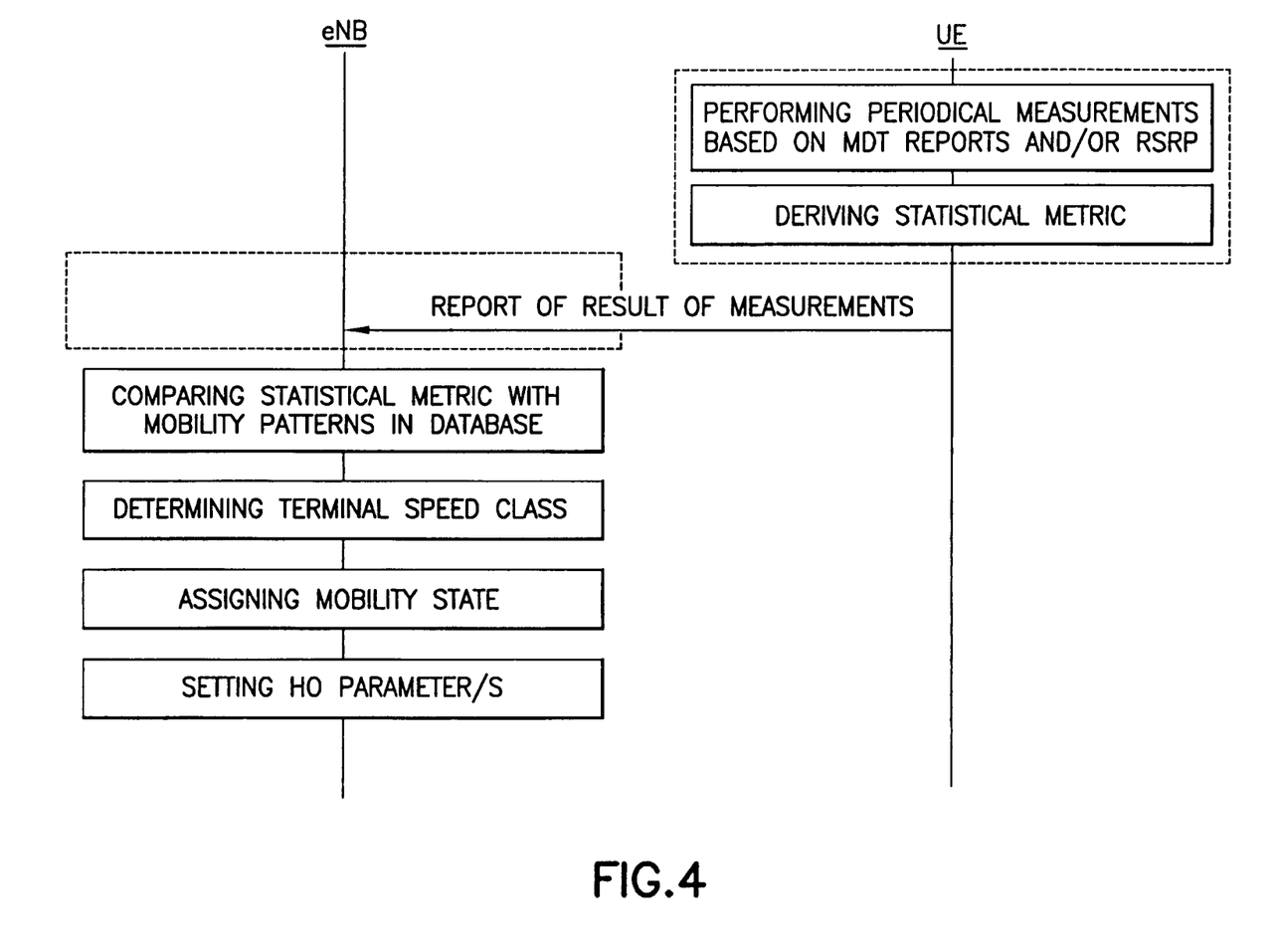
FIG. 4 shows a signaling diagram illustrating a third example of a procedure according to exemplary embodiments of the present invention.

According to exemplary embodiments of the present invention, the acquisition operation of the statistical metric may be realized in different ways, e.g. by way of different distributions of individual functionalities, as illustrated in FIGS. 2 to 4 below.

According to exemplary embodiments of the present invention, terminal mobility state detection may be realized as explained in detail hereinafter.

Generally, the acquisition of the statistical metric according to exemplary embodiments of the present invention may comprise (or be based on) performing periodical measurements of a terminal's signal strength and deriving the statistical metric based on the measurements or the results thereof. More specifically, either a UE (i.e. the terminal) or an eNB (i.e. a network entity) may perform the measurements. If a UE performs the measurements, these may for example be based on RSRP, and they are then reported to the eNB. If the eNB performs the measurements, these may for example be based on PHR and/or MDT reports, in which case the UE mobility state detection is invisible for the UE itself. According to exemplary embodiments of the present invention, the signal strength measurement are based on standardized measurement/reporting procedures, such those for MDT purposes. According to exemplary embodiments of the present invention, an average and/or a standard deviation measurement of a squared difference may be applied.

According to exemplary embodiments of the present invention, measurement periodicity and/or period, which may for example be realized by a corresponding timer, may be set according to time requirements and/or constraints so as to achieve a sufficiently fast UE mobility state detection. For example, the measurement periodicity may be in the order of several hundred milliseconds (e.g. 400 ms), and the measurement period may be in the order of several seconds (e.g. 3 s to 35 s). Accordingly, when a specific measurement period (e.g. a corresponding timer) elapses, the measurements are completed and reported and/or processed accordingly. Specifically, the statistical metric may then be derived, thus representing a measurement sample. Such statistical metric may be derived from the behavior of the signal strength changes during the measurement period, and may for example consist of an average, a standard deviation, a minimum-maximum value, a correlation property, or the like of the signal strength measurements.

According to exemplary embodiments of the present invention, if the UE speed is known a priori, then the acquired statistical metric or sample (i.e. the measurement) may be applied for mobility pattern creation/update, and the thus created/updated mobility pattern (based on the acquired statistical metric or sample) may be stored in a corresponding database.

Stated in other words, the signal strength measurement, or the resulting metric or sample, of a terminal with known speed may be labeled according to the known UE speed, and the thus labeled measurement or metric or sample may be stored in the database. Accordingly, measurements of (a terminal with) known speed may be used to create/update mobility patterns which are used to determine UE speed class or detect UE mobility state quickly from measurements of (a terminal with) unknown speed.

According to exemplary embodiments of the present invention, if the UE speed is not known a priori, then the acquired statistical metric or sample (i.e. the measurement) is compared with the known samples or measurements in the database to determine UE speed class or detect UE mobility state. In this regard, any classification technique may be adopted. For example, as classification techniques, diffusion mapping may be used, as well as for example k-nearest neighbors search or a fuzzy logic approach. As a result of the classification with respect to the measurement of (a terminal with) unknown speed in the database of measurements of known speed (i.e. mobility patterns), a best match may be adopted as a result on the basis of the comparison. That is, a best match between the acquired statistical metric (of the measurement of unknown speed) and the mobility patterns (of measurements of known speed) in the database may be used for detecting the UE speed class as the speed class corresponding to the specific terminal speed class of the best-matching mobility pattern. Accordingly, terminal mobility state detection may be based on similarity and/or deviation between a recent measurement, i.e. an unknown sample, and training data, i.e. a known sample or mobility pattern, wherein the delay or window time between the periodical measurements underlying the terminal mobility state detection is employed as a parameter in this regard.

A classification technique in the meaning of the present description may for example relate to a data mining technique where unknown samples are compared to know classes (in the form e.g. of patterns or the like).

Stated in other words, the signal strength measurement, or the resulting metric or sample, of a terminal with known speed may be labeled according to the speed class (or range) of a mobility pattern representing a result of the comparison operation, e.g. a best-matching mobility pattern as a result of a classification operation. Accordingly, measurements of unknown speed may be classified for UE speed class determination or UE mobility state detection using measurements of known speed.

FIG. 2 shows a signaling diagram illustrating a first example of a procedure according to exemplary embodiments of the present invention.

As shown in FIG. 2, a procedure according to exemplary embodiments of the present invention may comprise that the eNB performs periodical measurements of the terminal's signal strength, and that the eNB derives the statistical metric from a behavior of the signal strength over the predetermined time period on the basis of the performed measurements.

Accordingly, an acquisition of a statistical metric of a terminal's signal strength measurements according to exemplary embodiments of the present invention, as indicated by a dashed box on the side of the eNB, may comprise performing the measurements and deriving the statistical metric at the eNB.

In this case, the terminal's signal strength relates to a downlink signal from the UE to the eNB. That is to say, the signal strength measurement relates to a downlink measurement of received signal strength of a signal being transmitted from the eNB and received at the UE, and the operation at the eNB is based on a corresponding uplink report received from the UE (as indicated by a dashed line arrow).

FIG. 3 shows a signaling diagram illustrating a second example of a procedure according to exemplary embodiments of the present invention.

As shown in FIG. 3, a procedure according to exemplary embodiments of the present invention may comprise that the UE performs periodical measurements of the terminal's signal strength and reports the obtained measurement data as a result of measurements to the eNB, that the eNB receives, from the UE, this report of the result of measurements, i.e. the periodical measurements, and that the eNB derives the statistical metric from a behavior of the signal strength over the predetermined time period on the basis of the reported measurements.

Accordingly, an acquisition of a statistical metric of a terminal's signal strength measurements according to exemplary embodiments of the present invention, as indicated by a dashed box on the side of the eNB, may comprise receiving a report of the periodical measurements from the terminal and deriving the statistical metric at the eNB.

Accordingly, an obtainment of a result of measurements of a terminal's signal strength over a predetermined time period according to exemplary embodiments of the present invention, as indicated by a dotted box on the side of the UE, may comprise performing periodical measurements of the terminal's signal strength at the terminal, wherein the measurement data is obtained as the result of measurements.

In this case, the terminal's signal strength relates to a downlink signal from the eNB to the UE. That is to say, the signal strength measurement relates to a downlink measurement of received signal strength of a signal being transmitted from the eNB and received at the UE.

FIG. 4 shows a signaling diagram illustrating a third example of a procedure according to exemplary embodiments of the present invention.

As shown in FIG. 4, a procedure according to exemplary embodiments of the present invention may comprise that the UE performs periodical measurements of the terminal's signal strength, and that the UE derives a statistical metric from a behavior of the signal strength over the predetermined time period on the basis of the performed measurements and reports the obtained derived statistical data as a result of measurements to the eNB, that the eNB receives, from the UE, this report of the result of measurements, i.e. the statistical metric of a behavior of the terminal's signal strength over the predetermined time period.

Accordingly, an acquisition of a statistical metric of a terminal's signal strength measurements according to exemplary embodiments of the present invention, as indicated by a dashed box on the side of the eNB, may comprise receiving a report of the statistical metric of the periodical measurements from the terminal at the eNB.

Accordingly, an obtainment of a result of measurements of a terminal's signal strength over a predetermined time period according to exemplary embodiments of the present invention, as indicated by a dotted box on the side of the UE, may comprise performing periodical measurements of the terminal's signal strength at the UE, and deriving a statistical metric from a behavior of the signal strength over the predetermined time period on the basis of the performed measurements at the UE, wherein the derived statistical data is obtained as the result of measurements.

In this case, the terminal's signal strength relates to a downlink signal from the eNB to the UE. That is to say, the signal strength measurement relates to a downlink measurement of received signal strength of a signal being transmitted from the eNB and received at the UE.

As evident from FIGS. 3 and 4, a method according to exemplary embodiments of the present invention, which is operable at or by a terminal or user equipment of a cellular communication system, e.g. a LTE system or the like, may comprise an operation of obtaining a result of measurements of a terminal's signal strength over a predetermined time period, and an operation of reporting the obtained result of measurements to a network entity of a cellular communication system, e.g. an eNB.

As shown in any one of FIGS. 2 to 4, the determined terminal speed class or the detected terminal mobility state may be utilized for further purposes as explained below.

According to exemplary embodiments of the present invention, the eNB may assign a mobility state (or class or type) for the UE based on the determined terminal speed class. Accordingly, the above-outlined UE speed class determination may be beneficially utilized for discriminating between UE mobility states (or classes or types). Such mobility state (or class or type) assignment may be based on the determined terminal speed class as such or the determined terminal speed class in connection with a result of a conventional mobility (state) estimation scheme. That is, for enhancing reliability, the result of the above-outlined UE speed class determination may be combine with the result of another known mobility (state) estimation scheme, such as for example any one of a timing advancing rate estimation, a specified (LTE) mobility (state) estimation scheme, which might be based on UE handover and/or cell re-selection rate, or the like. Generally, any known mobility (state) estimation scheme may be used, such as those indicated in the background section above.

While being referred to as mobility state herein, the property of terminal speed being assigned may also be referred to as mobility category, mobility type, mobility class, or the like.

According to exemplary embodiments of the present invention, the eNB may set at least one handover (HO) parameter for the terminal according to the terminal speed class or mobility state. Such handover parameter setting may thus be appropriate in view of the UE speed or speed class. Accordingly, the above-outlined UE speed class determination may be beneficially utilized in the context of handover parameter setting, as described in the background section above. Stated in other words, according to exemplary embodiments of the present invention, a mobility robustness optimization (MRO) including an automated HO parameter optimization improving network performance by minimizing handover-related radio link failures and ping-pong handovers may be achieved. In this regard, RRC parameters and/or measurements relevant for HO procedures, e.g. the A3 algorithm, may be reconfigured accordingly.

Such mobility robustness optimization (MRO) according to exemplary embodiments of the present invention is beneficial in terms of requirements and/or constraints regarding accuracy, duration (delay) and/or demand for dedicated hardware/software. Further, such mobility robustness optimization (MRO) according to exemplary embodiments of the present invention is reliable, also in heterogeneous network environments where cell sizes vary. Accordingly, robust service for users and optimized network performance for operators may be attained.

Any signaling according to FIGS. 3 and 4 may for example be based on RRC procedures.

Figure 5:
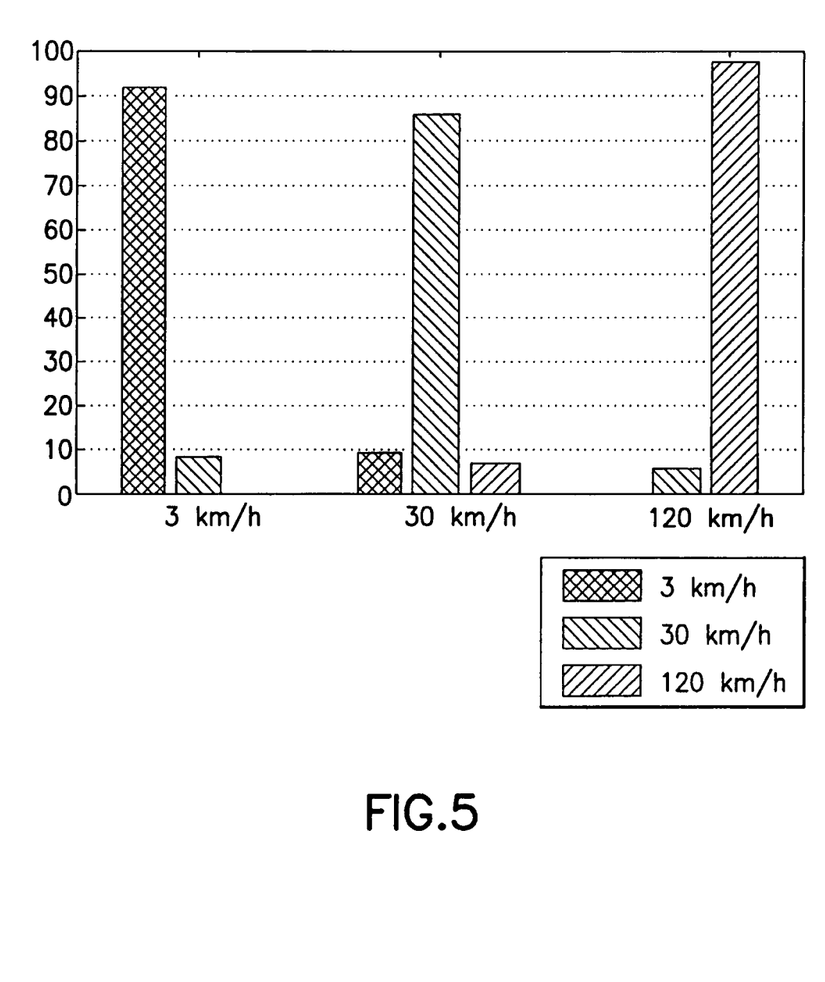
FIG. 5 shows a graph illustrating simulation results of a method according to exemplary embodiments of the present invention.

FIG. 5 shows a graph illustrating simulation results of a method according to exemplary embodiments of the present invention.

In the simulations underlying the graph according to FIG. 5, three cases of UE mobility are considered, namely UE speed classes of 3 km/h, 30 km/h and 120 km/h. The simulations are based on the following assumptions and conditions. The measurement periodicity was 400 ms and, the statistical metric derived from the measurements were based on the measuring periods of 5 s to 35 s, varying from UE to UE. Each UE measured and recorded a single sample, i.e. a single period of signal strength measurements. The half of the reported samples were assumed to be known, i.e. obtained by a UE with a known speed, and used to create/update the mobility patterns. The other half of the reported samples were assumed to be unknown, i.e. obtained by a UE with an unknown speed, and used to be classified in terms of speed/mobility. Specifically, the unknown samples were compared with a classification framework to the known samples. The classification was for example performed using a diffusion mapping framework. Unknown samples were labeled, i.e. the speed of the respective UE was determined, according to the mobility pattern which provided highest similarity with the known samples of a specific speed.

In FIG. 5, the three cases of different UE speed classes are plotted on the horizontal axis, while the percentages of assignment of samples to a respective speed class are plotted on the vertical axis.

As evident from FIG. 5, 91% of the 3 km/h samples were labeled correctly, 9% of the 3 km/h samples were labeled incorrectly as 30 km/h samples, and 0% of the 3 km/h samples were labeled incorrectly as 120 km/h samples. Similar results were achieved for the 30 km/h sample and the 120 km/h samples, respectively. Accordingly, the overall classification accuracy of the unknown samples was higher than 84%.

In view of these simulation results, it is derivable that the classification of unknown samples, i.e. the detection of terminal mobility/speed, according to exemplary embodiments of the present invention, can be done rather accurately as well as rather fast.

Referring to the above, according to exemplary embodiments of the present invention, a terminal (e.g. UE) or a network entity (e.g. eNB) collects periodical measurements of terminal signal strength over a time period (wherein the received power of a downlink signal is to be measured at the terminal), and the terminal (e.g. UE) or the network entity (e.g. eNB) calculates a statistical metric from the measurement. If the terminal mobility is known a priori, the measurement is labeled according to the terminal speed or speed class, and the labeled measurement is stored to a database. If the terminal mobility is not known, the labeling is done on the basis of comparing the measurement with the existing measurements of known speed in the database. The measurements of unknown speed are for example labeled according to the best match of the existing mobility patterns in the database. Accordingly, there is provided a cognitive approach of detecting the terminal mobility such as the terminal mobility state for mobile terminals whose speed is not known based on earlier measurements for mobile terminals with known speed.

According to exemplary embodiments of the present invention, cellular network problems may be solved or at least mitigated on the basis of the above-explained cognitive approach by way of adaptation to the environment and decision-making according to the adaptation. Since the mobility classification is based on the signal strength measurements which are available with a high periodicity (i.e. in short periods), the decisions may be made in a fast and reliable way.

Therefore, exemplary embodiments of the present invention may be effective for achieving various advantages.

Namely, for example, mobility problems may be detected in a fast and reliable way. The terminal speed class may be determined in (nearly) real-time, thus not only based an offline analysis as conventional techniques. Dedicated facilities for terminal speed measurement, such as GNSS e.g. based on GPS, are not needed for all terminals. Rather, training data may be gathered from those terminals having such dedicated speed measurement facilities, while such training data may be used to determine the speed class of the remaining terminals which do not have accurate speed information available. Training data for training the database and/or data for actual terminal mobility detection may be collected automatically based on standardized measurement/reporting procedures such as for those specified for MDT purposes. In this regard, it is specifically effective when periodical MDT measurements or periodical PHR reports are utilized for the periodical signal strength measurements.

While a database with mobility patterns is required for comparison purposes, such database may be located either at an access node or base station (such as e.g. eNB) or at any other network entity (such as e.g. RNC, MME or the like). Accordingly, the comparison operation, in particular the underlying database query or classification (e.g. data mining) operation, is performed locally or remotely.

The performance of terminal mobility state detection according to exemplary embodiments of the present invention may be influenced and, thus, adjusted on various parameters including e.g. the size of training data and/or the database, the length of the measurements (i.e. the period), the sensitivity to measurement averaging, and the like.

The terminal mobility state detection according to exemplary embodiments of the present invention is beneficial in terms of requirements and/or constraints regarding accuracy, duration (delay) and/or demand for dedicated hardware/software. Further, such mobility robustness optimization (MRO) according to exemplary embodiments of the present invention is reliable, also in heterogeneous network environments where cell sizes vary.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding methods and operations according to FIGS. 1 to 4.

Figure 6:
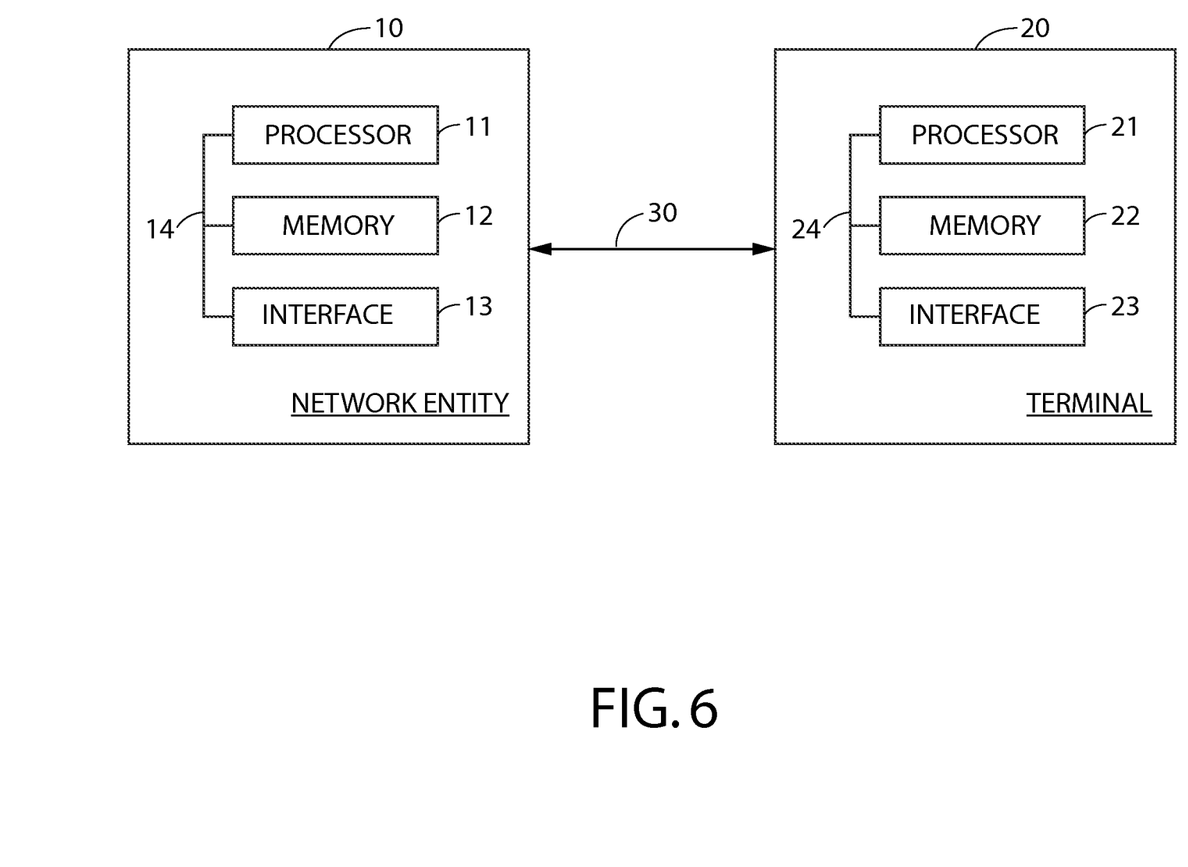
FIG. 6 shows a block diagram illustrating exemplary apparatuses according to exemplary embodiments of the present invention.

In FIG. 6 below, which is noted to represent a simplified block diagram, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a block diagram illustrating exemplary apparatuses according to exemplary embodiments of the present invention.

In view of the above, the thus described apparatuses 10 and 20 are suitable for use in practicing the exemplary embodiments of the present invention, as described herein. The thus described apparatus 10 may represent a (part of a) network entity, i.e. base station or access node or controller, such as for example a NodeB, an eNB, a RNC, or the like, as described above, and may be configured to perform a procedure and/or exhibit a functionality as described in conjunction with any one of FIGS. 1 to 4. The thus described apparatus 20 may represent a (part of a) device, terminal or user equipment UE, as described above, and may be configured to perform a procedure and/or exhibit a functionality as described in conjunction with any one of FIGS. 2 to 4.

As shown in FIG. 6, according to exemplary embodiments of the present invention, a network entity 10 comprises a processor 11, a memory 12, and an interface 13, which are connected by a bus 14 or the like, and a device, terminal or user equipment 20 comprises a processor 21, a memory 22, and an interface 23, which are connected by a bus 24 or the like. The device, terminal or user equipment 20 may be connected with the network entity 10 through a link or connection 30.

The memories 12 and 22 may store respective programs assumed to include program instructions that, when executed by the associated processors 11 and 21, enable the respective electronic device or apparatus to operate in accordance with the exemplary embodiments of the present invention. For example, the memory 12 of the network entity 10 may store the aforementioned database. The processors 11 and 21 and/or the interfaces 13 and 23 may also include a modem or the like to facilitate communication over the (hardwire or wireless) link 30, respectively. The interfaces 13 and 23 may include a suitable transceiver coupled to one or more antennas or communication means for (hardwire or wireless) communications with the linked or connected device(s), respectively. The interfaces 13 and 23 are generally configured to communicate with another apparatus, i.e. the interface thereof. For example, the interface 13 of the network entity 10 may communicate with another network entity (not shown) storing the database, if the database is not locally stored in the memory 12.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the interface 13 is generally configured for communication with at least another apparatus. The processor 11 is configured to acquire a statistical metric of measurements of a terminal's signal strength of a terminal with unknown terminal speed over a predetermined time period, to compare the acquired statistical metric with mobility patterns stored in a database, each of said mobility patterns exhibiting a relationship between previously acquired statistical metrics of signal strength measurements of terminals with a specific terminal speed class, and to determine a terminal speed class of the terminal according to a best match between the acquired statistical metric and the mobility patterns on the basis of the comparison.

According to exemplary embodiments of the present invention, the processor 11 may be configured to acquire a statistical metric of measurements of a terminal's signal strength of a terminal with known terminal speed over a predetermined time period, to apply the acquired statistical metric for creating or updating the mobility pattern with respect to the specific terminal speed class corresponding to the known speed of the terminal, and to store the created or updated mobility pattern in the database.

According to exemplary embodiments of the present invention, the processor 11, for acquiring, may be configured to perform periodical measurements of the terminal's signal strength, and derive the statistical metric from a behavior of the signal strength over the predetermined time period on the basis of the performed measurements, or to receive, from the terminal 20 via the interface 13, a report of periodical measurements of the terminal's signal strength and derive the statistical metric from a behavior of the signal strength over the predetermined time period on the basis of the reported measurements, or to receive, from the terminal 20 via the interface 13, a report of the statistical metric of a behavior of the terminal's signal strength over the predetermined time period.

According to exemplary embodiments of the present invention, the processor 11 may be configured to assign a mobility state for the terminal based on the determined terminal speed class or based on the determined terminal speed class in connection with a result of a mobility (state) estimation scheme, and/or to set at least one handover parameter for the terminal according to the determined terminal speed class or the assigned mobility state.

According to exemplary embodiments of the present invention, the interface 23 is generally configured for communication with at least another apparatus. The processor 21 is configured to obtain a result of measurements of a terminal's signal strength over a predetermined time period, and to report, via the interface 23, the obtained result of measurements to a network entity of a cellular communication system.

According to exemplary embodiments of the present invention, the processor 21, for obtaining, may be configured perform periodical measurements of the terminal's signal strength (of a downlink signal), wherein the measurement data is obtained as the result of measurements, or to perform periodical measurements of the terminal's signal strength (of a downlink signal), and derive a statistical metric from a behavior of the signal strength over the predetermined time period on the basis of the performed measurements, wherein the derived statistical data is obtained as the result of measurements.

According to exemplarily embodiments of the present invention, the processor 11 or 21, the memory 12 or 22 and the interface 13 or 23 can be implemented as individual modules, chipsets or the like, or one or more of them can be implemented as a common module, chipset or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for terminal mobility state detection. Such measures may exemplarily comprise acquiring a statistical metric of measurements of a signal strength of a terminal with unknown speed over a predetermined time period, comparing the acquired statistical metric with mobility patterns stored in a database, each of said mobility patterns exhibiting a relationship between previously acquired statistical metrics of signal strength measurements of terminals with a specific terminal speed class, and determining a terminal speed class of the terminal according to a best match between the acquired statistical metric and the mobility patterns on the basis of the comparison. The database may exemplarily be prepared comprising acquiring a statistical metric of measurements of a signal strength of a terminal with known speed, and applying the acquired statistical metric for creating or updating the mobility pattern with respect to the specific terminal speed class corresponding to the known speed of the terminal.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS eNB evolved Node B (E-UTRAN base station)
E-UTRAN Evolved Universal Terrestrial Radio Access Network
GNSS Global Navigation Satellite System
GPS Global Positioning System
HO Handover
LTE Long Term Evolution
MDT Minimization of Drive Tests
MME Mobility Management Entity
MRO Mobility Robustness Optimization
PHR Power Headroom Report
RNC Radio Network Controller
RRC Radio Resource Control
RSRP Reference Signal Received Power
UE User Equipment

What is claimed is:

1. A method for operating a wireless network comprising
   acquiring, at the wireless network, a first statistical metric of measurements of a first terminal's signal strength of the first terminal with unknown terminal speed over a first predetermined time period,
   comparing, at the wireless network, the acquired first statistical metric with mobility patterns stored in a database, each of said mobility patterns exhibiting a relationship between previously acquired statistical metrics of signal strength measurements of terminals with a specific terminal speed class,
   determining, at the wireless network, a terminal speed class of the first terminal according to a best match between the acquired first statistical metric and the mobility patterns on the basis of the comparison,
   acquiring, at the wireless network, a second statistical metric of measurements of a second terminal's signal strength of the second terminal with known terminal speed over a second predetermined time period,
   applying, at the wireless network, the acquired second statistical metric for creating or updating the mobility pattern with respect to the specific terminal speed class corresponding to the known speed of the second terminal, and
   storing, at the wireless network, the created or updated mobility pattern in the database.

2. The method according to claim 1, wherein said acquiring comprises one of:
   performing periodical measurements of the first terminal's signal strength, and deriving the first statistical metric from a behavior of the first terminal's signal strength over the first predetermined time period on the basis of the performed measurements,
   receiving, from the first terminal, a report of periodical measurements of the first terminal's signal strength, and deriving the first statistical metric from a behavior of the signal strength over the first predetermined time period on the basis of the reported measurements, and
   receiving, from the first terminal, a report of the first statistical metric of a behavior of the first terminal's signal strength over the first predetermined time period.

3. The method according to claim 1, further comprising
   assigning a mobility state for the first terminal based on the determined terminal speed class or based on the determined terminal speed class in connection with a result of a mobility estimation scheme, and/or
   setting at least one handover parameter for the first terminal according to the determined terminal speed class or the assigned mobility state.

4. The method according to claim 1, wherein at least one of the following applies:
   the measurements are based on at least one of standardized MDT reports, power headroom reports and reference signal received power,
   the first statistical metric is based on a behavior of the first terminal's signal strength over the first predetermined time period and comprises at least one of an average, a standard deviation, a minimum-maximum value and a correlation property of the signal strength measurements,
   said comparing is based on a classification technique, and
   the relationship exhibited by each of said mobility patterns comprises at least one of a distribution and a low-dimensional representation of the statistical metrics with respect to the specific terminal speed class.

5. The method according to claim 1, wherein at least one of the following applies:
   the method is executed by an access node or base station of a cellular communication system,
   the method is executed by an evolved Node B of a cellular communication system in accordance with LTE specifications, and
   the database is located at one of an access node, a base station, an evolved Node B, a radio network controller and any network control entity of a cellular communication system.

6. The method according to claim 1, wherein the mobility pattern includes a specific speed and/or a specific speed range and/or a specific speed type.

7. The method according to claim 1, wherein the mobility pattern is a distribution or a low-dimensional presentation of the first statistical metric with respect to the terminal speed class.

8. The method according to claim 1, wherein the database is located at one of an access node, a base station or a network control entity of a cellular communication system.

9. The method according to claim 8, wherein the database includes datasets, each being associated with the terminal speed or the terminal speed class.

10. The method according to claim 1, wherein the measurements of the terminal's signal strength is based on a downlink signal transmitted from the wireless network to the terminal.

11. An apparatus for operating a wireless network comprising
   an interface configured for communication with at least another apparatus, and
   a processor configured to acquire, at the wireless network, a first statistical metric of measurements of a first terminal's signal strength of the first terminal with unknown terminal speed over a first predetermined time period, compare, at the wireless network, the acquired first statistical metric with mobility patterns stored in a database, each of said mobility patterns exhibiting a relationship between previously acquired statistical metrics of signal strength measurements of terminals with a specific terminal speed class, determine, at the wireless network, a terminal speed class of the first terminal according to a best match between the acquired statistical metric and the mobility patterns on the basis of the comparison, acquire, at the wireless network, a second statistical metric of measurements of a second terminal's signal strength of a second terminal with known terminal speed over a second predetermined time period, apply, at the wireless network, the acquired second statistical metric for creating or updating the mobility pattern with respect to the specific terminal speed class corresponding to the known speed of the second terminal, and store, at the wireless network, the created or updated mobility pattern in the database.

12. The apparatus according to claim 11, wherein, for acquiring, the processor is configured to:

perform periodical measurements of the first terminal's signal strength, and derive the first statistical metric from a behavior of the first terminal's signal strength over the first predetermined time period on the basis of the performed measurements, or receive, from the first terminal via the interface, a report of periodical measurements of the first terminal's signal strength, and derive the first statistical metric from a behavior of the first terminal's signal strength over the first predetermined time period on the basis of the reported measurements, or receive, from the first terminal via the interface, a report of the first statistical metric of a behavior of the first terminal's signal strength over the first predetermined time period.

13. The apparatus according to claim 11, wherein the processor is further configured to assign a mobility state for the first terminal based on the determined terminal speed class or based on the determined terminal speed class in connection with a result of a mobility estimation scheme, and/or set at least one handover parameter for the first terminal according to the determined terminal speed class or the assigned mobility state.

14. The apparatus according to claim 11, wherein at least one of the following applies:

the measurements are based on at least one of standardized MDT reports, power headroom reports and reference signal received power, the first statistical metric is based on a behavior of the first terminal's signal strength over the first predetermined time period and comprises at least one of an average, a standard deviation, a minimum-maximum value and a correlation property of the signal strength measurements, the processor, for comparing, is configured to perform a classification data mining technique, and the relationship exhibited by each of said mobility patterns comprises at least one of a distribution and a low-dimensional representation of the statistical metrics with respect to the specific terminal speed class.

15. The apparatus according to claim 11, wherein at least one of the following applies:

the apparatus is executed by an access node or base station of a cellular communication system, the apparatus is executed by an evolved Node B of a cellular communication system in accordance with LTE specifications, and the database is located at the apparatus or any network control entity of a cellular communication system.

16. The apparatus according to claim 11, wherein the mobility pattern includes a specific speed and/or a specific speed range and/or a specific speed type.

17. The apparatus according to claim 11, wherein the mobility pattern is a distribution or a low-dimensional presentation of the statistical metric with respect to the terminal speed class.

18. The apparatus according to claim 11, wherein the database is located at one of an access node, a base station or a network control entity of cellular communication system.

19. The apparatus according to claim 18, wherein the database includes datasets, each being associated with the terminal speed or the terminal speed class.

20. The apparatus according to claim 11, wherein the measurements of the first terminal's signal strength is based on a downlink signal transmitted from the wireless network to the first terminal.

* * * * *